United States Patent [19]

Mercer

[11] Patent Number: 4,693,096
[45] Date of Patent: Sep. 15, 1987

[54] BRAKE LINE COUPLER LOCK

[76] Inventor: Sarah F. Mercer, 1007 - 18th St., P.O. Box 1036, Albert Lea, Minn. 56007

[21] Appl. No.: 939,039

[22] Filed: Dec. 8, 1986

[51] Int. Cl.⁴ .............................................. E05B 73/00
[52] U.S. Cl. .......................................... 70/14; 70/58; 70/237
[58] Field of Search ...................... 70/61, 237, 253, 14, 70/258, 15, 60, 57, 58; 280/507

[56] References Cited

U.S. PATENT DOCUMENTS

| | | | |
|---|---|---|---|
| 438,735 | 10/1890 | Miller | 70/61 |
| 602,982 | 4/1898 | Ennis . | |
| 1,413,194 | 4/1922 | Sherman | 70/253 |
| 2,571,349 | 10/1951 | Eckles . | |
| 2,662,389 | 12/1953 | McKitrick . | |
| 3,593,549 | 7/1971 | Lakins . | |
| 4,094,173 | 6/1978 | Brown | 70/237 |
| 4,122,693 | 10/1978 | Borr . | |
| 4,226,103 | 10/1980 | Strickland . | |
| 4,325,237 | 4/1982 | Menzie . | |

*Primary Examiner*—Robert L. Wolfe
*Attorney, Agent, or Firm*—Orrin M. Haugen; Thomas J. Nikolai; Frederick W. Niebuhr

[57] ABSTRACT

Disclosed is a locking device for securing an unattached trailer. The device includes an elongate, flat and ductile bar, along which two 90° transverse bends are made, forming a medial base and parallel and opposed first and second arms. A locking pin is mounted to the base and extends in the direction of the arms, and first and second retainer openings are formed near the free end of the first and second arm, respectively, and beyond the locking pin. The device is secured to a brake line coupler by insertion of the locking pin into the air passage recess of the coupler so that the arms extend beyond the coupler, then by securing either padlock shackle or a retaining bolt through the first and second openings.

12 Claims, 5 Drawing Figures

U.S. Patent    Sep. 15, 1987    4,693,096
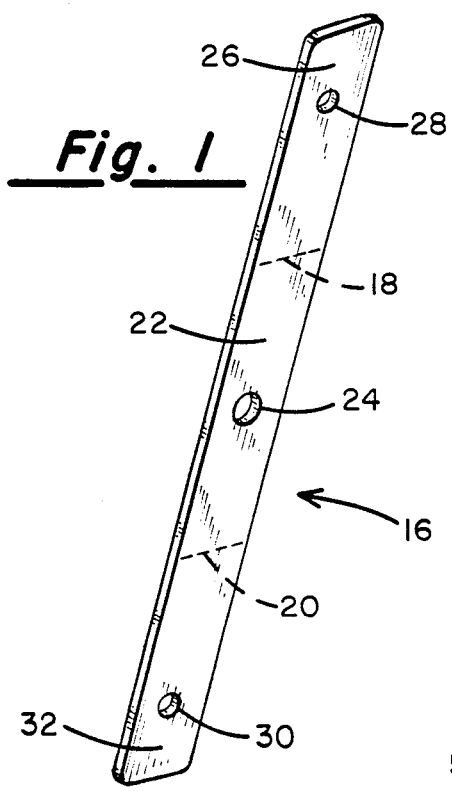
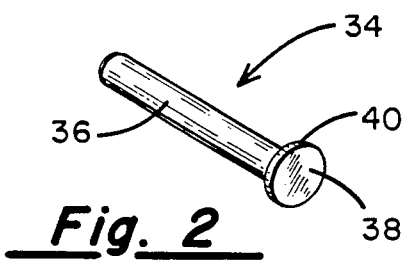
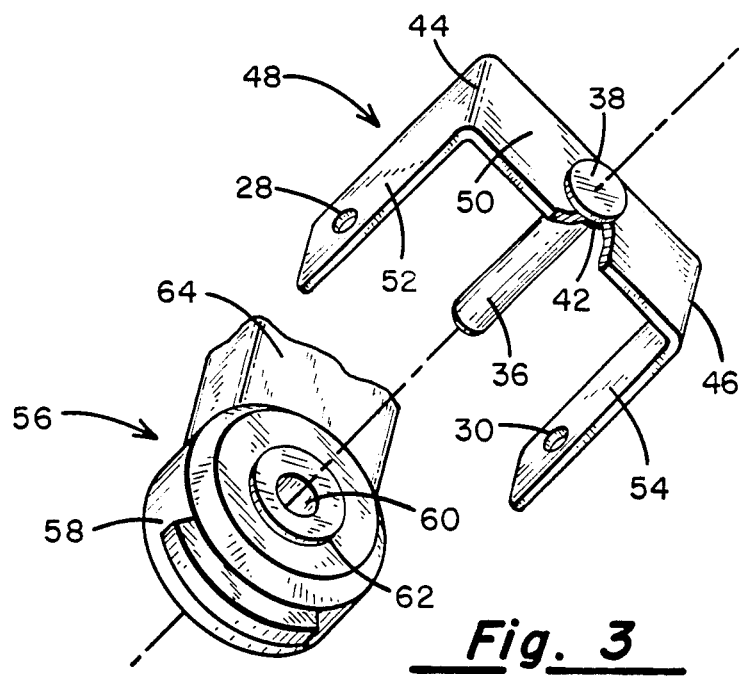
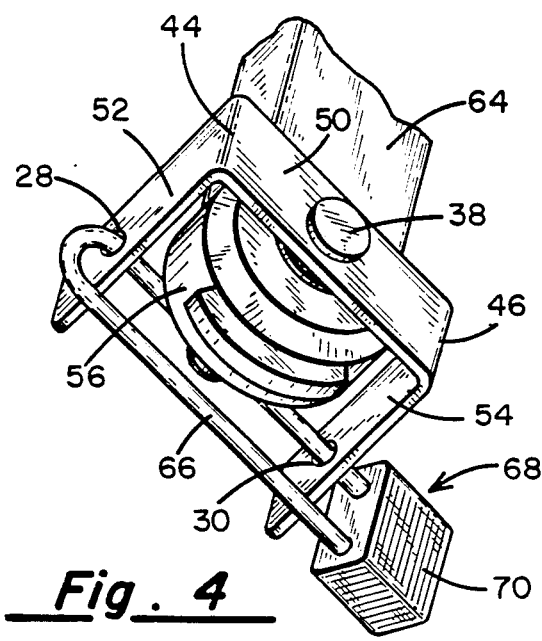
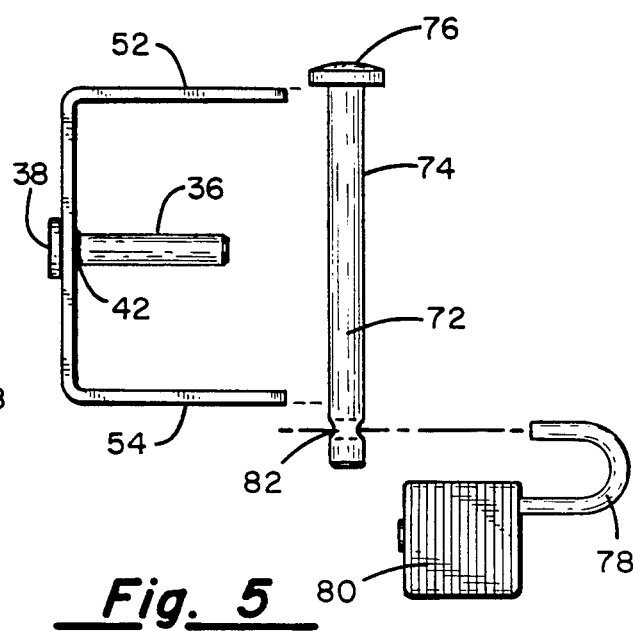

BRAKE LINE COUPLER LOCK

BACKGROUND OF THE INVENTION

This invention relates to locking devices for securing semitrailers, and more particularly to devices designed for releasable connection to the brake line or "glad hand" coupler of such trailers.

In the course of hauling loads by a semitrailer, it is not unusual for a driver to temporarily disconnect the tractor from the semitrailer. As such tractors and trailers typically utilize air brakes, separation of the semitrailer contemplates disengaging disconnecting an air hose from the brake line coupler on the semitrailer. When a trailer is left unattended, it is a well known practice to connect a locking device to the brake line coupler. One such locking device is disclosed in U.S. Pat. No. 4,226,103 to Strickland granted Oct. 7, 1980. Strickland shows a locking device 17 with a tongue 21, a flange having an opening 27, and a depressible key operated plunger 38. The tongue fits into a recess 34 of a glad hand coupler 3, with the opening 27 simultaneously surrounding a tongue 13 of the glad hand. Also, a plunger 38 is inserted into an opening 19 of the glad hand to lock the trailer. For similar purposes, U.S. Pat. No. 4,325,237 to Menzie granted Apr. 20, 1982 shows a brake line coupler lock having a key-operated cylinder 12. A pair of locking fingers at the bottom of the cylinder keep the cylinder in the glad hand until a key is used to free the cylinder.

More generally, U.S. Pat. No. 3,593,549 to Lakins granted July 20, 1971 shows a locking device for a pressure regulator. A locking pin 52 of the device has a head at one end, and a transverse opening at the other end for receiving a padlock. Also, U.S. Pat. No. 2,662,389 to McKitrick granted Dec. 15, 1953 shows a lock for an electrical switch, in which a cover plate 33 is retained by a pin inserted through holes in the cover plate. A padlock fits through an eye 40 of the pin to keep it in place.

These devices, while satisfactory in certain respects, do not adequately address the need for a locking device which is simple, reliable, and usable with brake line couplers of different sizes and shapes. The Strickland lock, for example, requires the glad hand to have particularly positioned tongue and opening to receive the locking device tongue. The lock described by Menzie is secured solely by relatively small fingers, and thus provides little resistance t determined tampering.

Therefore, it is an object of the present invention to provide a brake line coupling locking device that is inexpensive, relatively easy to manufacture, and reliable.

Another object of the invention is to provide a locking device suitable for a variety of brake line couplings of different sizes and shapes.

A further object of the invention is to provide a locking device that can utilize a conventional padlock to secure a semitrailer.

Yet another object of the invention is to provide a locking device for semitrailers which is virtually unaffected by bad weather or other unfavorable conditions.

SUMMARY OF THE INVENTION

To achieve these and other objects, there is provided a security device for releasable connection to a brake line coupler of a trailer. The device includes a generally planar, substantially rigid base. An elongate locking pin is mounted to the base and extends from the base in a direction generally perpendicular to the plane of the base. A first locking arm extends from one end of the base and is inclined with respect to the plane of the base. A second locking arm extends from the opposite end of the base and also is inclined with respect to the plane. The device further includes a substantially rigid retaining member. A first retaining means is formed near the free end of the first arm, and a second retaining means is formed near the free end of the second arm. These retaining means are adapted for mutually releasably engaging the retaining member. When so engaging the retaining member, and with the locking pin inserted into a recess open to one side of a trailer brake line coupler, the retaining means cooperate to secure the retaining member on the opposite side of the brake line coupler to prevent removal of the pin from the recess.

The security device can readily be manufactured, employing the following steps:

(a) forming a central aperture through a medial portion of an elongate, substantially rigid, flat and ductile bar;

(b) forming a first retainer opening through the bar near one end of the bar, and a second retainer opening through the bar near the opposite end thereof;

(c) inserting a pin having an enlarged head portion through the central aperture to position the head portion against the medial portion;

(d) welding the pin to the medial portion on the side opposite to the surface contiguous with the head portion;

(e) forming a first transverse bend at a first location along the bar to form a first arm extended from one end of the medial portion and inclined relative to the plane of the medial portion; and (f) forming a second transverse bend at a second location along the bar to form a second arm extending from the opposite end of the medial portion and inclined relative to the plane.

Preferably, the angular bends are 90° so that the arms and pins extend from the base or medial portion in substantially the same direction. When the retaining means are retainer openings formed in the arms, the retaining member can be an elongate retaining bar, and further can be part of the shackle portion of a conventional padlock. Preferably, the retaining bar is held across the side of the brake line coupler opposite to the side to which the pin containing recess is open.

A result of the above arrangement is that the base, arms and retaining bar cooperate to surround the brake line coupler, with the locking pin maintained in the recess by virtue of the retaining bar in the retainer openings. The locking pin need not have a precise fit within the coupler recess to be reliably secured. The retainer openings advantageously are positioned to be farther away from the base than the free end of the locking pin. The distance between these openings and the pin need not be selected with precision, a fact which further enhances flexibility of the security device. Unlike coupler locks with built-in locking cylinders or other mechanisms, the security device of the present invention is suitable for use with a variety of padlock styles, ranging from a basic, inexpensive padlock to render theft at least inconvenient, to more sophisticated, stronger locks affording greater protection. Further, because the locking mechanism is separate, it may be exchanged in the event it begins to rust or is otherwise damaged. The base, arms and locking pin, particularly when constructed of steel, are virtually impervious to weather.

IN THE DRAWINGS

For a better understanding of the above and other features and advantages, reference is made to the detailed description and the drawings, in which:

FIG. 1 is a perspective view of an elongate bar used in forming a brake line coupler security device in accordance with the present invention;

FIG. 2 is a perspective view of a locking pin used in forming the security device;

FIG. 3 is a persective view of the assembled security device positioned for connection with a brake line coupler of a semitrailer;

FIG. 4 is a perspective view showing the security device connected to the brake line coupler with a padlock; and FIG. 5 is an end elevation showing a retaining bar for use with the security device in lieu of the padlock.

DETAILED DESCRIPTION OF THE PREFERRED EMBODIMENT

Turning now to the drawings, there is shown in FIG. 1 a flat, ductile, elongate locking bar 16 approximately 7" long and having a transverse width of about 1". Bar 16 preferably is constructed of steel with a thickness of about 3/16". Broken lines at 18 and 20 indicate first and second transverse bend locations, where transverse bends are formed in the course of constructing a brake line coupler lock in accordance with the present invention.

Between them, first and second locations 18 and 20 define a medial portion 22 of the locking bar. A central aperture 24 approximately ⅜" in diameter is drilled through locking bar 16 at the center of the medial portion. Above the medial portion, as viewed in the figure, is a first end 26 of the locking bar. A first retainer opening 28 is formed through the locking bar near end 26. Likewise, a second retainer opening 30 is formed through the locking bar near a second end 32.

FIG. 2 illustrates a locking pin 34 having a cylindrical shank 36 with a diameter of about ⅜" or slightly less for a sliding fit within central aperture 24. At one end of the shank is an enlarged head 38 having a flat surface 40. After central aperture 24 and retainer openings 28 and 30 are formed in locking bar 16, shank 36 is inserted into the central aperture until head 38, particularly flat surface 40, is contiguous with medial portion 22 in the surface area surrounding the central aperture. As seen in FIG. 3, a weld 42 is formed on the opposite side of locking bar 16 following pin insertion. First and second 90° bends 44 and 46 are formed at locations 18 and 20, respectively, to complete a brake line coupler locking device 48.

The bending of locking bar 16 forms at the medial portion a base 50 which supports the locking pin, and further forms a first locking arm 52 extending from one end of the base and perpendicular to the base, and a second locking arm 54 extending from the opposite end of base 50 in the same direction as first arm 52. The locking arms also extend parallel to the axis of pin 34.

Locking device 48 is shown in facing relation to a brake line coupler 56 of the type typically forming part of the system for delivering pressurized air to the brakes of a semitrailer. Coupler 56 includes a body 58 shaped to form an air opening 60. A rubber grommet 62 lines the rim of opening 60 to facilitate an essentially leak-proof connection between an air supply hose (not shown) with coupler 56. In addition to providing passage for air to and from a brake line extended to a housing 64, opening 60 provides a recess into which shank 36 of the locking pin is inserted when locking device 48 is connected to the brake line coupler.

Given the perferred length for locking bar 16, locations 18 and 20 are selected to achieve two ends: first, to determine a length for base 50 slightly greater than the width of brake line coupler 56; and second, to position first and second retainer openings 28 and 30 beyond the free end of shank 36, with respect to the base. The advantage of so choosing the bend locations is best understood from FIG. 4, in which a shackle portion 66 of a conventional padlock 68 is inserted through retainer openings 28 and 30, and locked into a padlock body portion 70. The selected base length effectively positions first and second arms 52 and 54 apart from one another a distance greater than the diameter of coupler 56, yet for a somewhat tight fit.

Also, the position of retaining openings 28 and 30 beyond shank 36 enables the placement of shackle 66 along and slightly spaced apart from the left side of coupler 56, as viewed in FIG. 5, with shank 36 inserted into the recess formed by air opening 60. This recess is open to the right side of the coupler. In effect, the portion of shackle 66 between openings 28 and 30 forms a retaining bar which abuts coupler 56 to prevent withdrawal of shank 36 from opening 60, thus to prevent its removal until padlock 68 is unlocked and the shackle removed from the retainer openings. More particularly, first and second retainer openings 28 and 30 are positioned on their respective arms so that the edge of each opening nearest base 50 is about 1 9/16" from the base. The length of shank 36 is chosen so that it will project from base 50 a distance of about 1 5/16". Thus, there is a separation in the direction of the locking pin axis of ¼" between the shank and retainer opening edges.

It is understood that in this arrangement, neither the length nor the diameter of shank 36 is critical to the effective engagement of locking device 48 to the brake line coupler, so long as the distance between the retaining bar portion of shackle 66 and the free end of shank 36, horizontal as viewed in FIG. 4, is sufficiently small to prevent removal of pin 34 from opening 60 without first disengaging the padlock. Further, while the arm separation is desirably only slightly greater than the coupler width or diameter, a wide range of acceptable differences between such spacing and coupler diameter has been found satisfactory, particularly if the previously mentioned horizontal distance is properly selected.

FIG. 5 shows a retaining bolt 72 that can be used in lieu of padlock 68 to secure the locking device. Bolt 72 has a cylindrical shank 74 and an enlarged head portion 76, to enable the retention of locking bolt 72 in first and second retainer openings 28 and 30, particularly when the shank 78 of a small padlock 80 is inserted through a bore 82 in shank 78 near its free end. Retaining bolt 72 enables the use of a smaller, less expensive padlock. On the other hand, a larger padlock such as shown at 68 is preferred when greater security is desired.

Due to its simple construction, locking device 48 provides an inexpensive means for securing an unattached trailer. Regardless of whether the retaining bar is formed by bolt 72 or shackle 66, the padlock can readily be exchanged or replaced as desired, whether to increase security or because a particular lock has rusted or is otherwise damaged. The previously discussed separation between the retainer openings and shank is selected in relation to the thickness of a side wall of brake line coupler 56, a thickness which tends to vary little from one brand of coupler to another. Consequently, locking device 48 is suitable for use with couplers of different diameters and with air passage recesses of varying diameters and depths.

What is claimed is:

1. A security device for releasable connection to a brake line coupler of a trailer, said device including:

a generally planar, substantially rigid base and means forming an aperture through said base;

an elongate locking pin extended through said aperture and away from the base in a direction generally perpendicular to the plane of said base, and a fastening means on one side of said base for integrally securing the pin with respect to the base;

a first locking arm extended from one end of the base and inclined with respect to said plane; and a second locking arm extended from the opposite end of the base and inclined with respect to said plane;

a substantially rigid retaining member; a first retaining means formed near the free end of said first arm; and a second retaining means formed near the free end of said second arm; said retaining means adapted for mutually releasably engaging said retaining member and, when so engaging said retaining member with said locking pin inserted into a recess open to one side of a trailer brake line coupler, cooperating to secure said retaining member on the opposite side of said brake line coupler to prevent removal of said pin from said recess.

2. The security device of claim 1 wherein:

said pin includes an enlarged head portion abutting said base, and said fastening means includes a weld formed on the side of the base opposite the side contiguous with said head portion.

3. The security device of claim 2 wherein:

said first and second retaining means comprise first and second retainer openings formed near the free ends of said first and second arms, respectively; and said retaining member is insertable into said retaining openings to releasably engage the locking arms.

4. The security device of claim 3 wherein:

said retaining member comprises an elongate retaining bar, and said first and second openings are positioned farther from said plane than the free end of said pin.

5. The apparatus of claim 4 wherein:

said retaining bar forms part of a shackle portion of a padlock.

6. The security device of claim 4 wherein:

said retaining bar has an enlarged retaining portion at one end, and means for securing a padlock at the other end.

7. A process for manufacturing a security device for releasable connection to a brake line coupler of a trailer, said process including the steps of:

(a) forming a central opening through a medial portion of an elongate, substantially rigid, flat and ductile bar;

(b) forming a first retainer opening through the bar near one end of the bar, and a second retainer opening through the bar near the opposite end thereof;

(c) inserting a pin having an enlarged head portion through said central opening to position the head portion against the medial portion;

(d) welding the pin to the medial portion on the side of said medial portion opposite to the side contiguous with the head portion;

(e) forming a first transverse bend at a first location along said bar to define a first arm extended from one end of said medial portion and inclined relative to the plane of the medial portion; and (f) forming a second transverse bend at a second location along the bar to define a second arm extended from the opposite end of the medial portion and inclined relative to said plane.

8. The process of claim 7 wherein:

the transverse bends of steps (e) and (f) are substantially 90°.

9. The process of claim 7 wherein:

the distance between the transverse bends is slightly greater than the width of a brake line coupler.

10. The process of claim 7 wherein:

steps (e) and (f) further include selectively locating said transverse bends and bending said bar, to position said first and second retainer openings a greater distance from said plane than is the free end of said pin.

11. The security device of claim 2 wherein:

said first and second arms are inclined substantially 90° relative to said plane, and extend in substantially the same direction as said pin.

12. The security device of claim 2 wherein:

said arms and said base are formed of a unitary, elongate and generally flat bar, with first and second bends of substantially 90° along said bar at said one end and said opposite end of said base to form said first arm and said second arm, respectively.

* * * * *